(12) United States Patent
Inserra Imparato et al.

(10) Patent No.: US 9,399,329 B2
(45) Date of Patent: Jul. 26, 2016

(54) METHOD FOR PRODUCING A CLOSED-SECTION PORTION OF AN AIRCRAFT PROVIDED WITH DEFORMATION SENSORS

(71) Applicant: ALENIA AERMACCHI S.P.A., Venegono Superiore (IT)

(72) Inventors: Sabato Inserra Imparato, Venegono Superiore (IT); Giuseppe Lauria, Venegono Superiore (IT); Sergio Recchia, Venegono Superiore (IT); Alberto Russolillo, Venegono Superiore (IT); Carlo Arnone, Venegono Superiore (IT); Vincenzo De Vita, Venegono Superiore (IT); Antonio Fiore, Venegono Superiore (IT)

(73) Assignee: ALENIA AERMACCHI S.P.A., Venegono Superiore (IT)

( * ) Notice: Subject to any disclaimer, the term of this patent is extended or adjusted under 35 U.S.C. 154(b) by 470 days.

(21) Appl. No.: 13/911,488

(22) Filed: Jun. 6, 2013

(65) Prior Publication Data
US 2014/0151925 A1    Jun. 5, 2014

(30) Foreign Application Priority Data

Jun. 11, 2012  (IT) .............................. TO2012A0504

(51) Int. Cl.
| | | |
|---|---|---|
| *B29C 70/44* | (2006.01) | |
| *B29D 99/00* | (2010.01) | |
| *B29C 65/50* | (2006.01) | |
| *B29C 65/00* | (2006.01) | |

(Continued)

(52) U.S. Cl.
CPC ........ *B29D 99/0014* (2013.01); *B29C 65/5057* (2013.01); *B29C 66/5326* (2013.01); *B29C 66/61* (2013.01); *B29C 66/721* (2013.01); *B29C 66/81455* (2013.01); *B29C 65/4835* (2013.01); *B29C 66/7212* (2013.01); *B29C 66/73112* (2013.01); *B29L 2031/3076* (2013.01); *B64D 2045/0085* (2013.01)

(58) Field of Classification Search
CPC .............. B29C 66/721; B29C 65/5057; B29C 66/81455; B29C 66/5326; B29C 66/61; B29C 70/44; B29D 99/0014
See application file for complete search history.

(56) References Cited

U.S. PATENT DOCUMENTS

| | | | | |
|---|---|---|---|---|
| 3,089,108 A | * | 5/1963 | Gong ....................... | G01B 7/16 257/417 |
| 4,778,548 A | * | 10/1988 | Fox ....................... | C04B 37/028 156/153 |

(Continued)

FOREIGN PATENT DOCUMENTS

EP          0 582 160          2/1994

*Primary Examiner* — Matthew Daniels
(74) *Attorney, Agent, or Firm* — Gottlieb, Rackman & Reisman, P.C.

(57) ABSTRACT

A method for producing a closed-section portion of an aircraft wherein a strain gauge is glued on a first face of a flat tape that, in turn, is fastened on a face of a tool comprising a rigid elongated body covered by an extensible sack. The tool supporting the tape is arranged in a cavity of an aircraft structure. A vacuum is then created to obtain the expansion of the vacuum sack and perform the pressure gluing of the tape onto a wall of said cavity. The tool is subsequently extracted from the cavity. Upon conclusion of these operations, the tape is integrally fastened onto a wall of the cavity so that any deformation applied to this wall is transmitted to said strain gauge.

18 Claims, 3 Drawing Sheets

(51) Int. Cl.
*B29L 31/30* (2006.01)
*B64D 45/00* (2006.01)
*B29C 65/48* (2006.01)

(56) References Cited

U.S. PATENT DOCUMENTS 5,049,232 A * 9/1991 Tola ............... G01L 1/2287
216/20
5,087,187 A * 2/1992 Simkulak ............ B29C 43/32
264/258
5,132,063 A * 7/1992 Hughes ............. B29C 44/143
264/46.4
5,289,722 A 3/1994 Walker
2003/0079553 A1* 5/2003 Cain ................ G01M 3/002
73/861.27
2008/0223152 A1 9/2008 Georgeson
2008/0289426 A1 11/2008 Kearns

* cited by examiner

METHOD FOR PRODUCING A CLOSED-SECTION PORTION OF AN AIRCRAFT PROVIDED WITH DEFORMATION SENSORS

The present invention relates to a method for producing a closed-section portion of an aircraft provided with deformation sensors.

BACKGROUND OF THE INVENTION

Methods of producing aircraft structures comprising the following steps are known:
- inserting inside a mould, equipped with a first part and a second part, at least a first sheet of composite material, at least a second sheet of composite material facing the first sheet and spaced apart therefrom, and interconnection elements in a composite sheet material that extend between the first and the second sheet of composite material to delimit an elongated cavity;
- inserting a tool (plug) inside the elongated cavity comprising a rigid elongated body delimited by a number of flat faces and having a cross-section corresponding to that of the cavity—the entire length of the rigid body is covered by and enveloped in a tubular sack made of a deformable material;
- creating a vacuum in an autoclave inside which the mould is arranged to allow expansion of the sack, which presses against the walls of the cavity during a heating cycle in which the sheets of composite material fuse with each other; and
- extracting the tool from the cavity at the end of the heating cycle after having re-established the original pressure—at the end of the first heating cycle, the cavity is delimitated by the rigid walls of a closed-section aircraft structure.

SUMMARY OF THE INVENTION

The object of the present invention is to provide a method that enables applying—in a simple and effective manner—deformation sensors inside the so-obtained closed aircraft structure in order to provide it with sensors and allow direct measurement of deformation applied (in a test phase or in use) to the aircraft structure.

The foregoing object is achieved by the present invention in so far as it relates to a method for producing a closed-section portion of an aircraft provided with deformation sensors comprising the steps of: a) inserting inside a mould equipped with a first part and a second part, at least a first sheet of composite material, at least a second sheet of composite material facing the first sheet and spaced apart therefrom, and interconnection elements in a composite sheet material that extend between the first and the second sheet of composite material to delimit an elongated cavity; b) inserting inside the elongated cavity a tool comprising a rigid elongated body delimited by a number of flat faces and having a cross-section corresponding to that of the cavity—the entire length of said rigid body being covered by and enveloped in a tubular sack made of a deformable material; c) creating a vacuum in an autoclave inside which the mould is arranged to allow expansion of the sack, which presses against the walls of the cavity during a first heating cycle in which the sheets of composite material fuse with each other; d) extracting the tool from the cavity at the end of the first heating cycle after having re-established the original pressure—at the end of the first heating cycle said cavity is delimitated by rigid walls; and characterized in that it further comprises the steps of: e) preparing a flat tape having dimensions that allow it to be deposited on a face of the tool covered by a tubular sack made of a deformable material; f) permanently fastening a strain gauge on said flat tape; g) arranging said tape on the tool with its first face carrying the strain gauge facing the tool and the sack, and a second face facing the outside; h) depositing an adhesive layer on the second face of said tape; i) inserting said tool supporting said tape in said cavity; j) creating a vacuum and performing a second heating cycle to obtain the expansion of said vacuum sack, which performs the pressure gluing of said tape onto a wall of said cavity; h) extracting said tool from said cavity—at the end of said second heating cycle, said tape being integrally fixed on a wall of said cavity such that any deformations applied to said wall are transmitted to said strain gauge.

BRIEF DESCRIPTION OF THE DRAWINGS

The invention will now be illustrated with reference to the attached figures, where.

DETAILED DESCRIPTION OF THE INVENTION

Figure 1:
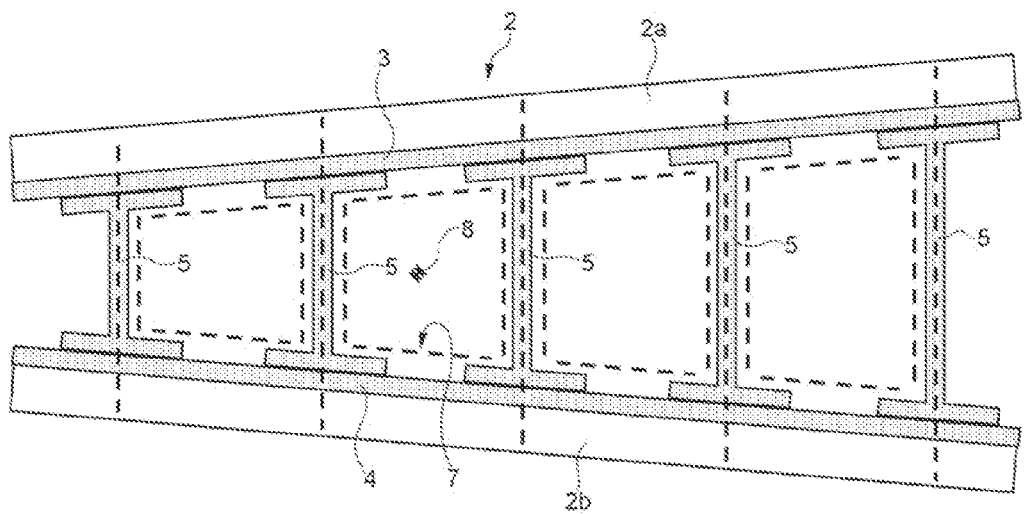
FIGS. 1-6 show successive steps of the method according to the present invention.

With reference to FIG. 1, a first step of the method of the present invention is shown where a mould 2 (of known type and therefore shown in an absolutely schematic manner) is used that is equipped with a first upper part or upper-tool 2a and a second lower part or lower-tool 2b, movable between an open position. (not shown) and a closed position (shown in the figures) under the thrust of actuators (not shown).

The following are arranged inside the mould 2: at least a first laminate of composite material 3 (typically impregnated carbon fibre) and at least a second laminate of composite material 4 (typically impregnated carbon fibre) facing the first laminate 3 and spaced apart therefrom; and interconnection elements 5 (side-members made of a composite material laminate) that extends between the first and the second laminates 3 and 4 of composite material to delimit at least one elongated cavity 7 along an axis 8.

In the example in FIG. 1, the first laminate and the second laminate 3 and 4 contained in the respective portions 2a and 2b lie on planes that intersect with each other and the interconnection elements 5 have an I-shaped cross-section to define a plurality of openings 7 having an approximately trapezoidal section.

Figure 2:
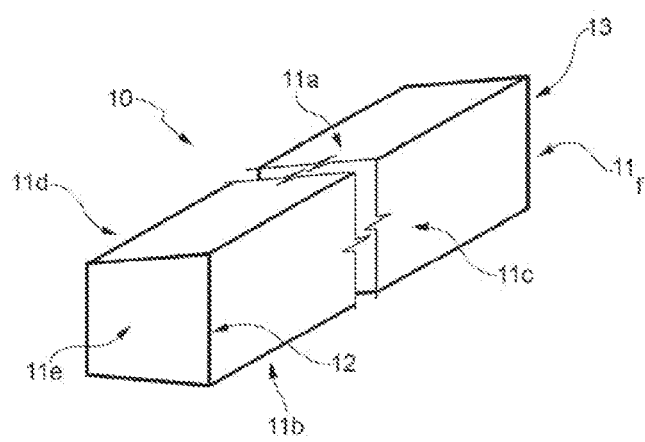

A tool 10 (FIG. 2—this tool, known as a "plug", is of known type and will not be described in further detail) is used in the method according to the invention that is formed by a rigid elongated body 13 delimited by a number of flat faces 11a, 11b, 11c, 11d, 11e and 11f and having a cross-section corresponding to that of the cavity 7. In the example, the tool 10 has a trapezoidal section and is delimited by four flat rectangular side faces 11a, 11b, 11c and 11d, and by two flat trapezoidal end faces 11e and 11f. The tool 10 comprises a tubular sack 12 that covers and envelopes the entire length of the rigid body 13. The sack 12 is made of deformable and extensible plastic material.

Figure 3:
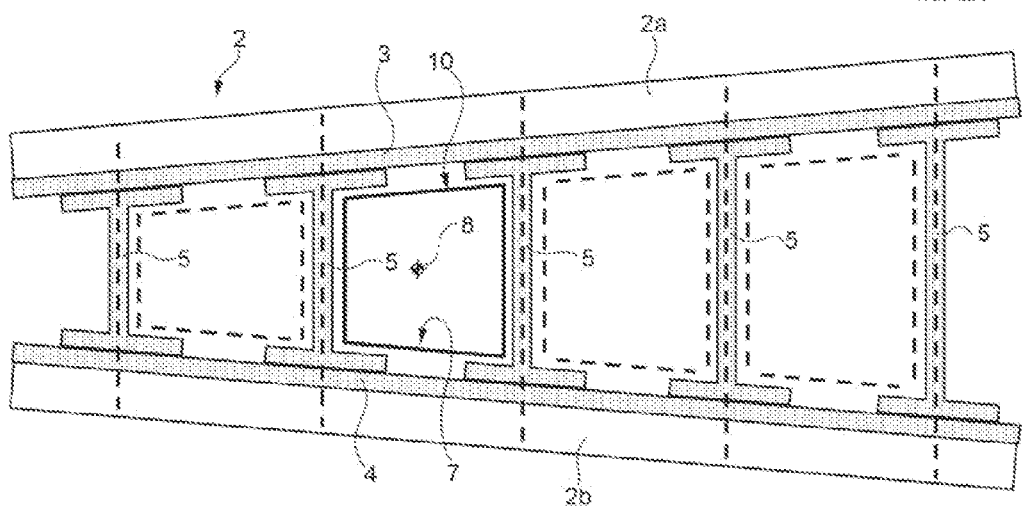

The tool 10 is subsequently inserted inside the elongated cavity 7, arranging it coaxially to the axis 8 (FIG. 3).

The mould 2 is placed in an autoclave (not shown) where a vacuum is created (typically with a relative pressure of −950 mbar) to enable the expansion of the sack 12 (which is sealed) so that it presses against the walls of the cavity 7. The autoclave is also heated (typically to a temperature of 180° C.) to perform the compaction and polymerization of the closed structure in which the laminates of composite material 3, 4 and 5 fuse with each other.

At the end of the first heating cycle, the original pressure is re-established (allowing the previously expanded sack 12 to collapse) and the tool 10 is extracted from the respective cavity 7.

Figure 4:
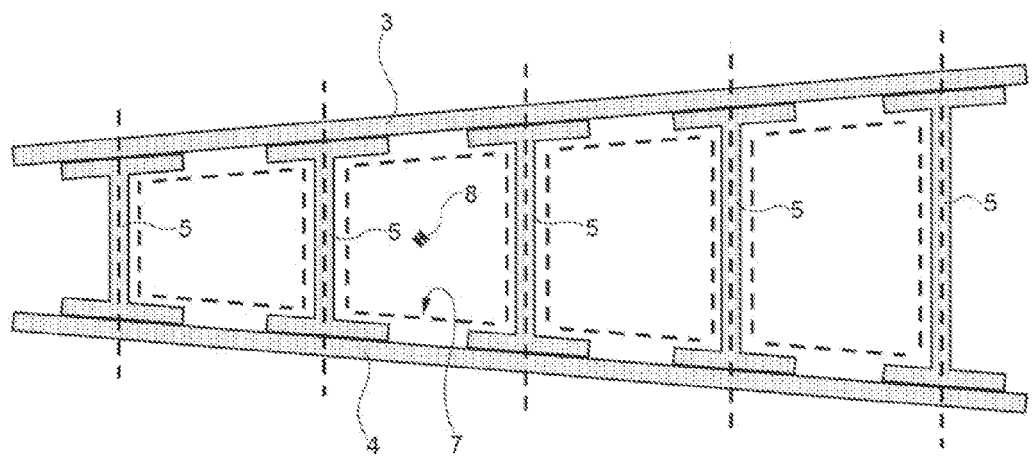

In this way, a closed-section aircraft structure is produced (FIG. 4) (for example, a wing section) in which the rigid walls 3, 4 and 5 delimit an internal cavity 7.

According to the present invention, successive steps are performed to arrange at least one deformation sensor in the closed-section aircraft structure using the same previously used and above-described tool 10.

In particular, a flat tape 15 is prepared (FIG. 5) having dimensions that allow it to be deposited on a face of the tool 10; for example, the tape 15 could have a rectangular perimeter with sides $l_1$ and $l_2$ smaller (or equal) to sides $L_1$ and $L_2$ of a face (for example, face 11a) of the tool 10 on which the tape is placed (the tape 15 is placed with its sides parallel to the respective sides of the face—11a in the example).

The tape 15 is made of fiberglass or an equivalent material with the characteristic of having a coefficient of expansion under load much lower than that of the structure to which it will be permanently fixed. In this way, the tape 15 can transmit the load deformation of the aircraft structure on which it is arranged to the deformation sensors it is provided with without appreciably altering the overall rigidity of the whole.

The following are permanently fastened to the tape 15:
- at least one foil strain gauge 17, made using known techniques and having reduced thickness; and
- a flat cable 25 with electrical connection tracks 26 for the strain gauge 17, made on a flexible insulating plastic support, for example Kapton.

The operations of fastening the foil strain gauge 17 and the flat cable 25 to the tape 15 can comprise:
- a decontamination and degreasing step (carried out, for example, by using isopropyl alcohol) on the area of the tape 15 on which the strain gauge 17 is to be arranged;
- a roughing step (carried out using known tools) on the area of the tape 15 on which the strain gauge 17 is to be arranged;
- a step of gluing the strain gauge 17 on the tape 15, carried out using known glues, for example, of the epoxy type that polymerizes at ambient temperature;
- a step of gluing the flat cable 25 on the tape 15 using double-sided adhesive tape (not shown for simplicity);
- a final control step in which the complete fastening of the foil strain gauge 17 to the tape 15 is checked (for example, checking the absence of air bubbles and/or areas of the strain gauge without glue);
- a step of connecting the electrical terminals of the strain gauge 17 to the electrical connection tracks 26 of the flat cable 25 by soldering.

Figure 5:
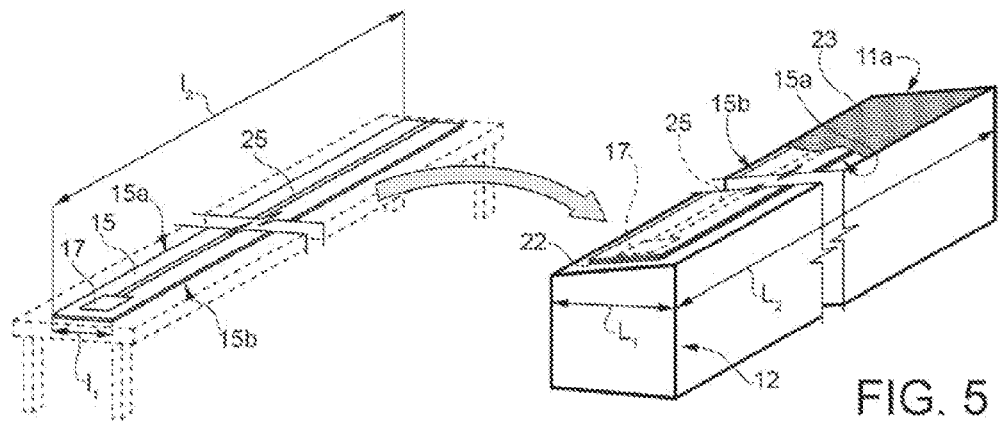

The aforementioned fastening operations can be carried out on a bench 19, shown in FIG. 5 with dashed lines.

The tool 10 is then covered, starting from the centre, with a tubular nylon sack 12, ventilation fabric (not shown for simplicity) and a layer of separator film (not shown for simplicity) wrapped in a tubular shape and longitudinally sealed for its entire length with adhesive tape. A vacuum (typically −100 mbar relative) is then applied to this last layer so that all of the covering material adheres to the tool 10, guaranteeing a precise geometric form.

Afterwards, the tape 15 is arranged (see the arrow indicated in FIG. 5) on the covered tool 10 with its first face 15a carrying the strain gauge 17 facing the layer of separator film and the sack 12, and a second face 15b facing the outside.

The second face 15b is completely covered with a thin adhesive layer 23 (for example, using an epoxy adhesive film that polymerizes at 120° C.)

The stable positioning of the tape on the covered tool 10 is then performed by using double-sided adhesive tape 22.

Figure 6:
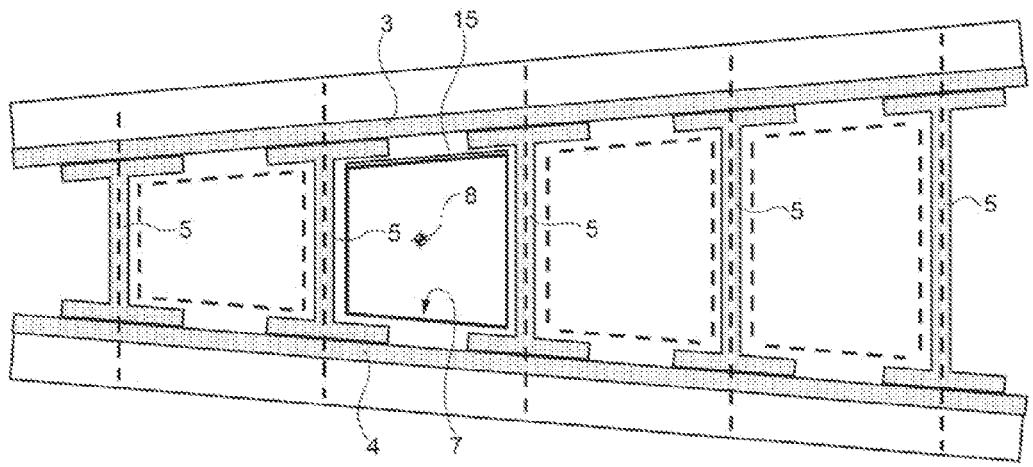

The covered tool 10 supporting the tape 15 equipped as described is again inserted in the respective cavity of the aircraft structure (FIG. 6), adjusting the insertion position to obtain the desired positioning of the strain gauge with respect to the closed structure.

Afterwards, the tubular nylon sack 12 arranged beforehand on the tool 10 is sealed at each of the longitudinal ends of the cavity involved inside the closed surface, thereby obtaining a single volume constituted by the inner surface of the cavity of the part and the surface of the nylon sack.

A vacuum is then applied to this volume that, by making the nylon sack 12 adhere to the inner surface of the part, pushes the tape 15 against the inner surface of the part.

Everything is then inserted in an autoclave where, by performing a cycle at 120° C. with a relative pressure of 3 bar, she tape is glued to the inner surface of the structure through the polymerization of the adhesive film 23.

In this way, the strain gauge 17 becomes permanently connected to the wall.

The tool 10 is extracted from the cavity 7 upon completion of the second heating cycle. In this way, the tape 15 is integrally fastened to the wall of the cavity so that any deformation applied to this wall is transmitted to the strain gauge 17. The aircraft structure is this "sensorized" by means of the strain gauge 17 that is "embedded" in the structure itself.

The method of the present invention therefore enables providing closed-section structural elements (e.g. wing panels) with sensors for the purpose of monitoring load deformation during mechanical testing and/or in operation.

Figure 7:
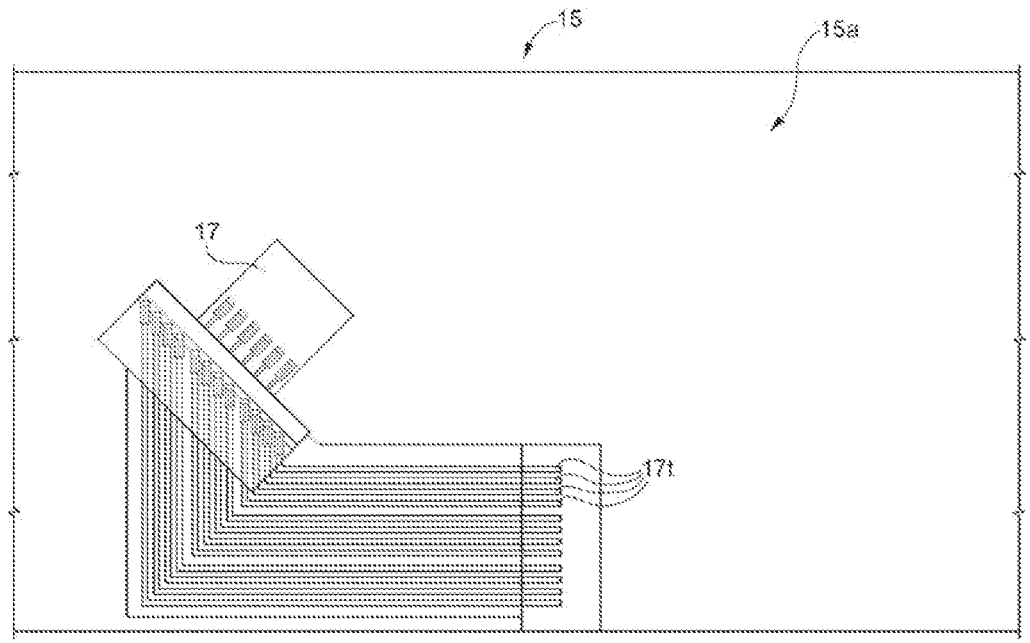
FIGS. 7 and 8 show details of the method.
Figure 8:
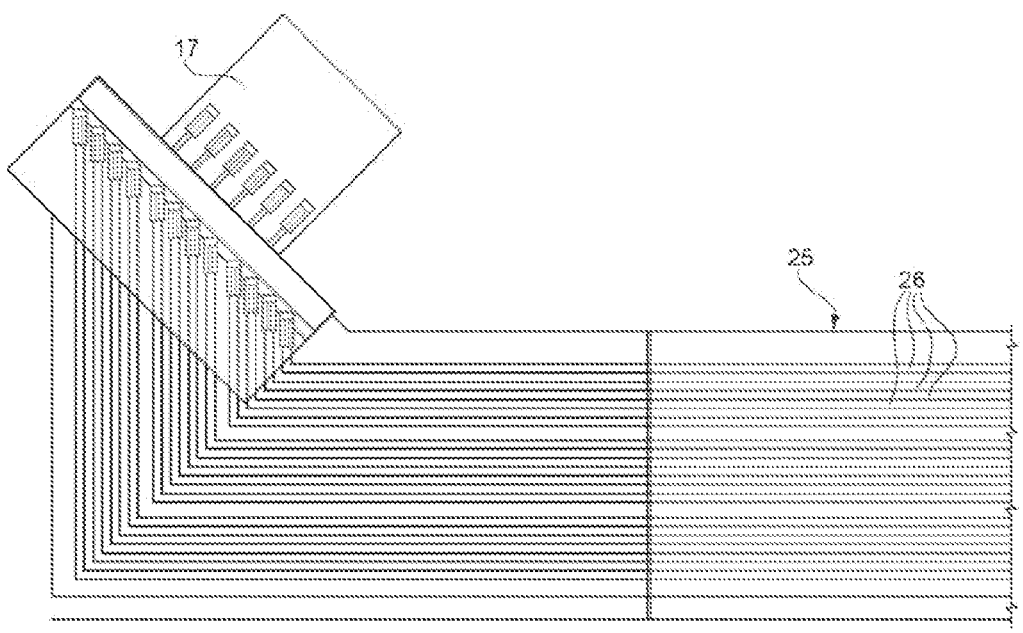

The wiring of the strain gauge is provided by a plurality of flexible metal conductors that have first ends connected to the output terminals 17t of the strain gauge 17 (FIGS. 7 and 8) and second ends (not shown) that emerge from the cavity 7. At the conclusion of the aforementioned operations, the flexible flat cable 25 extends inside the cavity formed in the aircraft structure.

The positioning and arrangement of the strain gauges 17 is performed by using the same lightweight tools (tool 10) that are already available in the production cycle.

The invention claimed is:

1. A method for producing a closed-section portion of an aircraft provided with deformation sensors comprising the steps of:
   a) inserting inside a mould (2) equipped with a first part (2a) and a second part (2b):
      at least a first sheet (3) of composite material,
      at least a second sheet (4) of composite material facing the first sheet and spaced apart therefrom; and
      interconnection elements (5) in a composite sheet material that extend between the first and the second sheets (3 and 4) of composite material to delimit an elongated cavity (7);
   b) inserting a tool (10) inside the elongated cavity (7), said tool (10) comprising a rigid elongated body delimited by a number of flat faces (11) and having a cross-section corresponding to that of the cavity (7)—the entire length of said rigid body being covered by and enveloped in a tubular sack (12) made of a deformable material;
   c) creating a vacuum in an autoclave inside which the mould is arranged to allow expansion of the sack (12), which presses against the walls of the cavity during a first heating cycle in which the sheets of composite material fuse with each other;

d) extracting the tool from the cavity (7) at the end of the first heating cycle after having re-established the original pressure—at the end of the first heating cycle said cavity is delimitated by rigid walls, and characterized in that it further comprises the steps of:

e) preparing a flat tape (15) having dimensions ($l_1$ by $l_2$) that allow it to be deposited on a face (11a) of the tool (10) covered by a tubular sack (12) made of a deformable material;

f) permanently fastening a strain gauge (17) on said flat tape (15);

g) arranging said tape (15) on the tool with its first face (15a) carrying the strain gauge (17) facing the tool and the sack, and a second face (15b) facing the outside;

h) depositing an adhesive layer (23) on the second face (15b) of said tape (15);

i) arranging in a ventilator fabric and a separator film between said tape (15) and said tubular sack (12);

j) inserting said tool (10) supporting said tape (15) in said cavity (7);

k) creating a vacuum and performing a second heating cycle to obtain the expansion of said vacuum sack (12), which performs the pressure gluing of said tape onto a wall of said cavity; and l) extracting said tool (10) from said cavity—at the end of said second heating cycle, said tape being integrally fixed on a wall of said cavity such that any deformations applied to said wall are transmitted to said strain gauge.

2. The method according to claim 1, wherein said tape is made of fibreglass.

3. The method according to claim 1, wherein said step f) comprises the step of gluing said strain gauge on said flat tape.

4. The method according to claim 1, wherein a flat cable of flexible insulating material (25), carrying a plurality of metal tracks (26) connectable to terminals (17t) of said strain gauge (17), is arranged on the first face (15a) of the tape (15).

5. The method according to claim 1, wherein said tape is secured on the tubular sack (12) of said covered tool (10) by means of double-sided adhesive tape.

6. The method according to claim 1, wherein a decontamination and degreasing step is carried out on the area of the tape on which said strain gauge is arranged.

7. The method according to claim 1, wherein a roughing step is carried out on the area of the tape on which said strain gauge is arranged.

8. The method according to claim 1 wherein a control step is carried out in which the complete fastening of said strain gauge on said tape is checked.

9. The method according to claim 1, wherein said tape (15) has a lower coefficient of expansion under load than that of the structure that delimits a wall of said cavity.

10. A method for producing a closed-section portion of an aircraft provided with deformation sensors comprising the steps of:

a) inserting inside a mould (2) equipped with a first part (2a) and a second part (2b):
  at least a first sheet (3) of composite material,
  at least a second sheet (4) of composite material facing the first sheet and spaced apart therefrom; and
  interconnection elements (5) in a composite sheet material that extend between the first and the second sheets (3 and 4) of composite material to delimit an elongated cavity (7);

b) inserting a tool (10) inside the elongated cavity (7), said tool (10) comprising a rigid elongated body delimited by a number of flat faces (11) and having a cross-section corresponding to that of the cavity (7)—the entire length of said rigid body being covered by and enveloped in a tubular sack (12) made of a deformable material;

c) creating a vacuum in an autoclave inside which the mould is arranged to allow expansion of the sack (12), which presses against the walls of the cavity during a first heating cycle in which the sheets of composite material fuse with each other;

d) extracting the tool from the cavity (7) at the end of the first heating cycle after having re-established the original pressure—at the end of the first heating cycle said cavity is delimitated by rigid walls, and characterized in that it further comprises the steps of:

e) preparing a flat tape (15) having dimensions ($l_1$ by $l_2$) that allow it to be deposited on a face (11a) of the tool (10) covered by a tubular sack (12) made of a deformable material:

f) permanently fastening a strain gauge (17) on said flat tape (15);

g) arranging said tape (15) on the tool with its first face (15a) carrying the strain gauge (17) facing the tool and the sack, and a second face (15b) facing the outside;

h) depositing an adhesive layer (23) on the second face (15b) of said tape (15);

i) inserting said tool (10) supporting said tape (15) in said cavity (7):

j) creating a vacuum and performing a second heating cycle to obtain the expansion of said vacuum sack (12), which performs the pressure gluing of said tape onto a wall of said cavity;

k) extracting said tool (10) from said cavity—at the end of said second heating cycle, said tape being integrally fixed on a wall of said cavity such that any deformations applied to said wall are transmitted to said strain gauge; wherein said tape (15) has a lower coefficient of expansion under load than that of the structure that delimits a wall of said cavity.

11. The method according to claim 10, wherein a step of arranging a ventilation fabric and a separator film between said tape (15) and said tubular sack (12) is included.

12. The method according to claim 10, wherein said tape is made of fibreglass.

13. The method according to claim 10, wherein said step f) comprises the step of gluing said strain gauge on said flat tape.

14. The method according to claim 10, wherein a flat cable of flexible insulating material (25), carrying a plurality of metal tracks (26) connectable to terminals (17t) of said strain gauge (17), is arranged on the first face (15a) of the tape (15).

15. The method according to claim 10, wherein said tape is secured on the tubular sack (12) of said covered tool (10) by means of double-sided adhesive tape.

16. The method according to claim 10, wherein a decontamination and degreasing step is carried out on the area of the tape on which said strain gauge is arranged.

17. The method according to claim 10, wherein a roughing step is carried out on the area of the tape on which said strain gauge is arranged.

18. The method according to claim 10, wherein a control step is carried out in which the complete fastening of said strain gauge on said tape is checked.

* * * * *